Figure 1B:
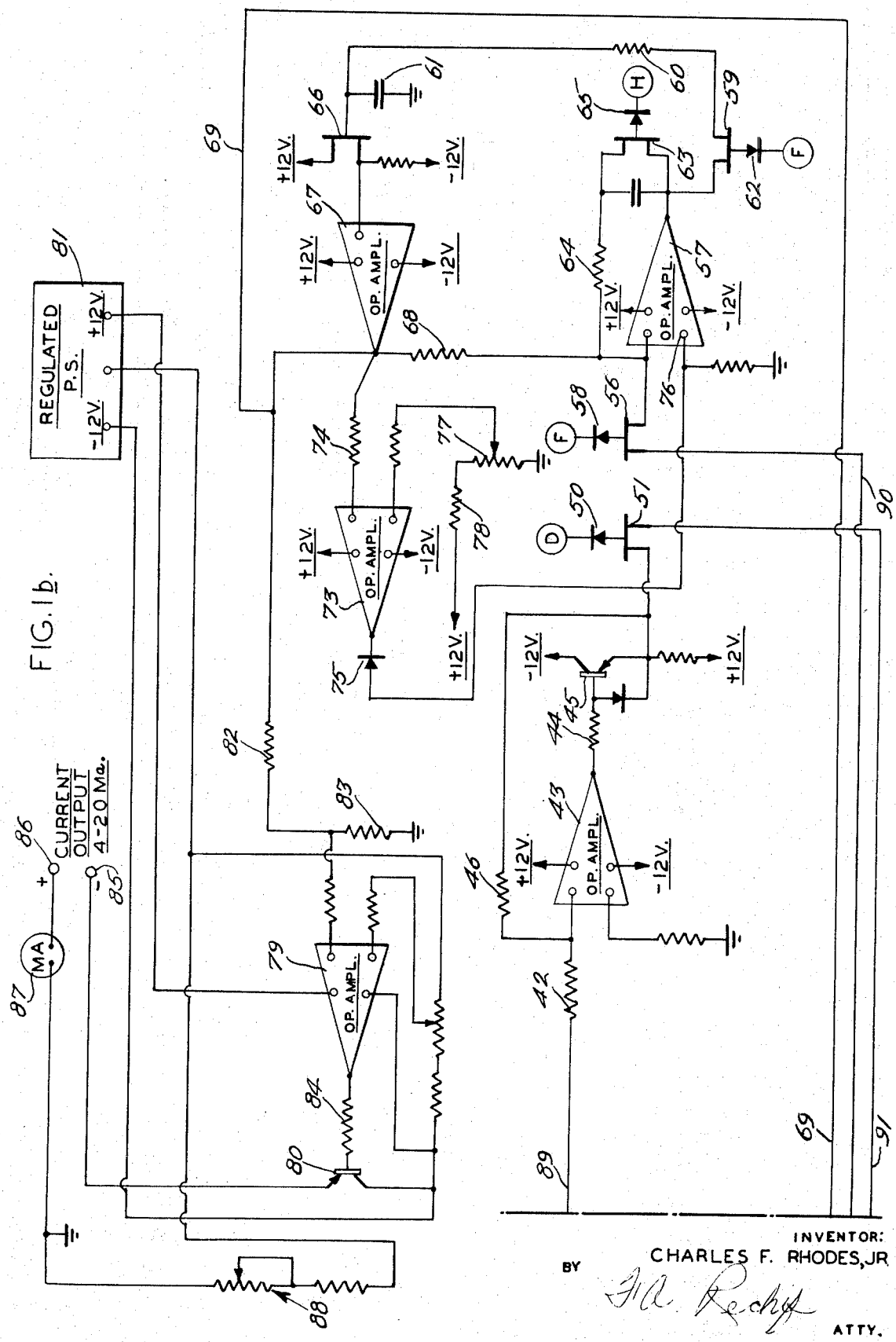

United States Patent
Rhodes, Jr.

[15] 3,698,237
[45] Oct. 17, 1972

[54] MEMORY CIRCUIT FOR CHROMATOGRAPHS

[72] Inventor: Charles F. Rhodes, Jr., Richardson, Tex.

[73] Assignee: Sun Oil Company, Philadelphia, Pa.

[22] Filed: Nov. 20, 1970

[21] Appl. No.: 91,375

[52] U.S. Cl..................73/23.1, 324/140 D, 328/151, 328/161
[51] Int. Cl..............................................G01n 31/08
[58] Field of Search ...............73/23.1; 328/151, 161; 235/184, 196; 324/140 D; 23/254, 255

[56] References Cited

UNITED STATES PATENTS 3,057,184   10/1962   Spracklen...................73/23.1
3,177,138   4/1965   Larrison......................73/23.1
3,448,291   6/1969   Burk et al................73/23.1 X Primary Examiner—Richard C. Queisser
Assistant Examiner—C. E. Snee, III
Attorney—George L. Church, Donald R. Johnson, Wilmer E. McCorquodale, Jr. and Frank A. Rechif

[57] ABSTRACT

A solid-state circuit useful with a two-component vapor phase chromatograph provides and stores a voltage representative of one of the two chromatograph peaks, and, in addition, obtains and stores a voltage representative of the ratio between the two peaks. The circuit includes an arrangement for limiting the ratio to some adjustable value, which enables the full scale of the recorder to be utilized.

8 Claims, 2 Drawing Figures

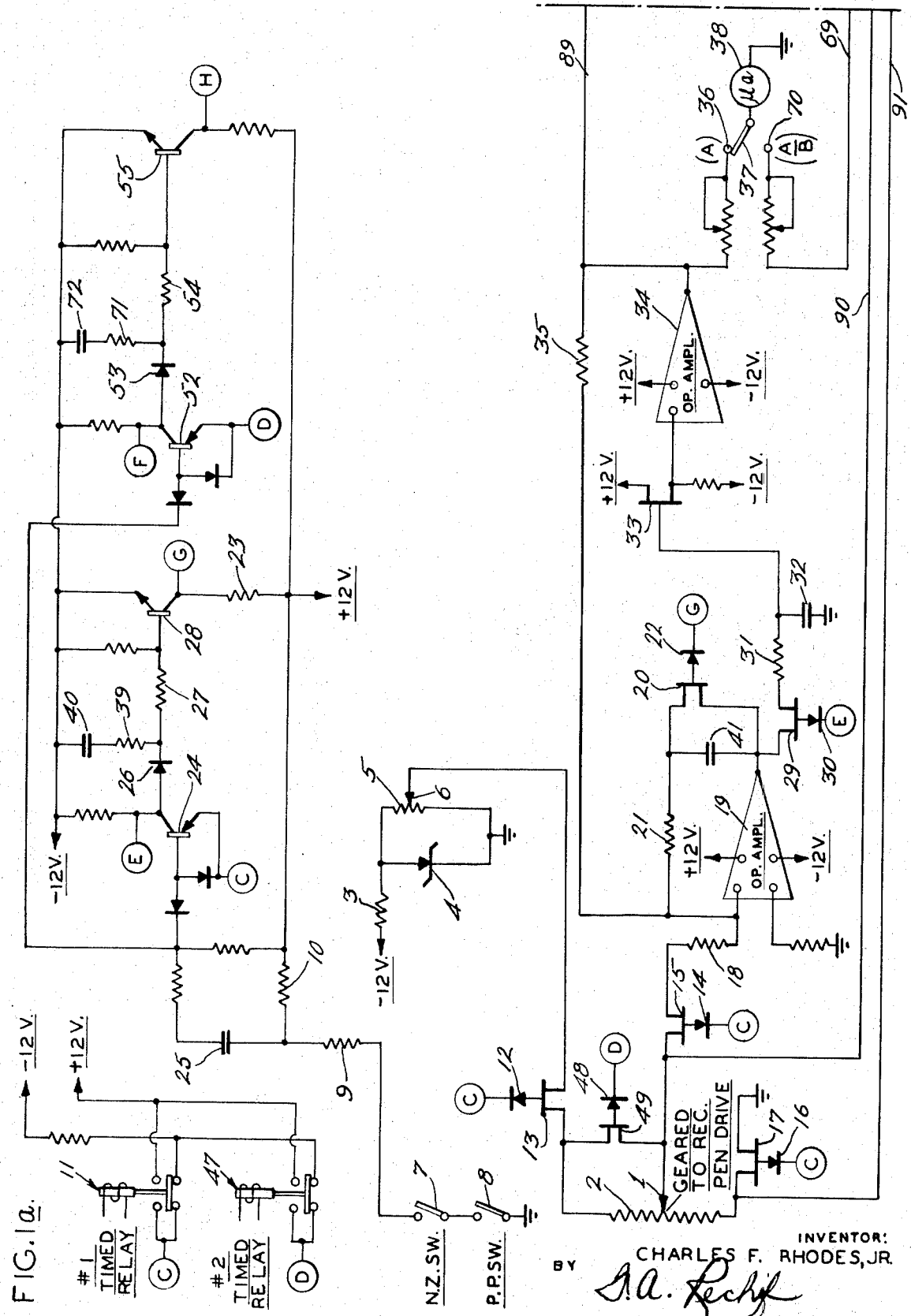

MEMORY CIRCUIT FOR CHROMATOGRAPHS

This invention relates to vapor phase (normally termed "gas") chromatography, and more particularly to a memory-hold circuit useful as an adjunct to a two-component chromatograph-recorder system.

A vapor-phase chromatograph converts a gas mixture into a train of voltage (or current) peaks proportional to individual and respective component gas volumes, identifiable by elution time, and sends this information to a recorder. The recorder displays these peaks, referenced to a zero baseline. A quantitative analysis can then be made from peak height. In a two-component chromatograph, there are two of these peaks, and their times of elution from the chromatographic column are known.

It is desirable in many instances to have certain information obtained from the chromatographic analysis constantly available (so that it may be read out on a meter, for example). Thus, information as to the height of the first component peak may be desired, as well as the ratio of the first component peak height to that of the second component peak. Both of these items of information may be derived by (and stored in) a memory-hold circuit associated with the chromatograph recorder.

Presently, there is being used in chromatography an arrangement employing vacuum tubes which operates to store a voltage representative of a chromatograph peak, and also to store a voltage representative of the ratio of two peaks, all in a memory-hold circuit. This tube arrangement uses, in the ratio determining portion of the circuit, a voltage dividing system, in order to establish current flow through the transmitting potentiometer (which is geared to the pen drive mechanism of the recorder). As a result of using this voltage dividing system, the arrangement requires a zero suppression circuit (including a battery and potentiometer) in the control attenuator chassis, in order to achieve linearity; this in turn necessitates changing the recorder scale from 0–100 percent to 10–100 percent. This limitation of the recorder scale is a drawback.

The circuit of the present invention does not require a voltage dividing system and so does not require a zero suppression circuit; hence, it has the ability to use the full 0–100 percent scale of the recorder, directly.

The existing tube arrangement occasionally exhibits a photocell effect when exposed to a strong light, which causes drift in the hold (memory) circuit; in addition, it requires dangerously high potentials for its operation. The solid-state circuit of this invention, on the other hand, does not exhibit this photocell characteristic, and requires a maximum potential of only ± 12 volts for operation.

The existing tube arrangement utilizes a Zener diode to limit the ratio output; this provides a fixed limit. On the other hand, the circuit of the present invention utilizes an operational amplifier (controllable over a wide range) to limit the ratio output; this provides the ability to set the ratio limit anywhere from zero to one.

Further, the circuit of the present invention utilizes solid-state devices throughout, and thus provides the well-known (and substantial) advantage of the elimination of the power required for heaters in a tube circuit.

The objects of this invention are accomplished, briefly, in the following manner:

Two peaks "A" and "B," representing the gaseous components to be evaluated, elute from the chromatograph detector system at a fixed time interval. When peak "A" elutes, a switching circuit transfers a voltage representative of its height to a capacitor, and it is stored thereon. At a later time, when peak "B" elutes, the "A" voltage is switched through a variable resistor (whose resistance value is proportional to peak "B") to the input of an operational amplifier, to develop at the output of this amplifier a voltage representing the ratio of peak "A" to peak "B" times a known, fixed calibration constant. The voltage representing the height of "A" and the voltage representing the ratio of "A" to "B" are both stored in memory-hold circuits, and may be read off selectively by means of a meter. A potentiometer, connected to the input of an operational amplifier, is used to limit the "ratio" output to a preselected value.

A detailed description of the invention follows, taken in conjunction with the accompanying drawings, wherein FIGS. 1a and 1b together comprise a schematic diagram of a circuit according to the present invention.

Referring now to the drawings, the slider 1 of a three-turn potentiometer 2 is geared to the pen drive mechanism of the recorder of a gas chromatograph in such a way that, for full scale deflection of the recorder pen, the potentiometer slider will have rotated three revolutions. If a voltage is connected across the ends of the potentiometer, the maximum output voltage of the potentiometer (maximum voltage of the slider with respect to some reference point such as ground) will be proportional to the height of the chromatograph peak. A conventional isolated constant voltage supply (not shown) of plus and minus 12 volts d.c. is used to power the solid-state memory-hold circuit being described. An adjustable voltage for connection across the ends of the potentiometer 2 is obtained from the negative terminal of this regulated power supply by way of a resistor 3, and is stabilized and temperature compensated by means of a Zener diode 4 across which is a potentiometer 5 having an adjustable slider 6. The voltage at slider 6 is set at −5 volts (d.c.) with respect to ground.

Located in the recorder of the chromatograph are two microswitches connected in series, a "near zero" switch 7 and a "peak picker" switch 8. The "near zero" switch 7 is actuated near the zero point of the recorder, this switch being closed above zero and being open below zero.

The "peak picker" switch 8 is friction driven, being open as long as the recorder pen is being driven away from zero, then closing the moment the recorder pen reverses direction. When switches 7 and 8 are both closed, one end of a resistor 9 is grounded. The other end of this resistor is connected through a resistor 10 to the positive terminal (+12 volts) of the power supply. The "near zero" switch 7 acts to open the circuit when the recorder pen nears zero, eliminating the possibility of "peak picking" on noise transients.

As previously stated, the elution times of the peaks from the chromatographic separation column are known. A first timed relay 11, actuated for example by means of a cam-operated switch the cam for which is driven by a timing motor, is energized shortly before component peak "A" is read out on the recorder.

When this relay is energized, a positive 12-volt potential derived from the power supply is applied to connection point C, and thus (1) via a diode 12 to the gate electrode of a field effect transistor (FET) 13 operating as a switch; (2) via a diode 14 to the gate electrode of a similar FET switch 15; and (3) via a diode 16 to the gate electrode of a similar FET switch 17. Thus, when relay 11 is actuated (energized), the FET switches 13, 15, and 17 all close. This connects the slider 6 to one end of the transmitting potentiometer 2, and the other end of this potentiometer to ground; the negative potential of five volts is then connected across this potentiometer, and the wiper 1 is connected through a resistor 18 to the inverting input of an operational amplifier 19. The output of amplifier 19 is connected through the controlled current flow path of a FET switch 20 and a resistor 21 back to its inverting input. The gate electrode of switch 20 is connected via a diode 22 to connection point G, and thence over a resistor 23 to the positive 12-volt potential; therefore, switch 20 is closed at this time. Thus, amplifier 19 acts as an inverting amplifier with unity gain.

Transistor 24 is also armed at this time, which is to say that its emitter circuit is connected (by connection point C and the energized relay 11) to +12 volts.

As component peak "A" is read out on the recorder, the "near zero" switch 7 closes. At the peak of recorder pen travel, the "peak picking" switch 8 closes, grounding resistor 9 through switches 7 and 8. This produces a pulse of 100 milliseconds length (determined in part by the capacitance of a capacitor 25 one plate of which is connected to the junction of resistors 9 and 10; it will be recalled that the resistor 9 is connected to + 12 volts through resistor 10) at the input of transistor 24. Since transistor 24 is armed at this time, it conducts, and the pulse is transmitted over a diode 26 and a resistor 27 to the input of a transistor 28; transistor 28 conducts, placing a negative voltage at connection point G and opening switch 20.

Connection point E (at the collector of transistor 24) is positive at this time, so the FET switch 29 (whose gate electrode is connected to E via a diode 30) closes, connecting the output of amplifier 19 to a resistor 31. A storage capacitor 32 is connected from the end of resistor 31 opposite the FET 29, to ground, and the common junction of resistor 31 and capacitor 32 is connected through a FET 33 (operating as an amplifier) to the input of an operational amplifier 34. From the output of amplifier 34, a resistor 35 is connected back to the inverting input of amplifier 19. Capacitor 32 charges at this time to a voltage which will flow the necessary current through transistor 33, amplifier 34, and resistor 35 to make the inverting input terminal of amplifier 19 have a zero potential. The source voltage of transistor 33 is then proportional to the peak amplitude of component "A." This voltage is taken off from the output of amplifier 34 to a switching terminal 36, and may be monitored (when selector switch 37 is in the position illustrated) by means of a microammeter 38.

The action described in the preceding paragraph (which takes place upon the grounding of resistor 9 by "peak picker" switch 8 to produce a pulse) occurs at the onset or leading edge of the pulse. As the pulse produced by the grounding of resistor 9 turns off (that is, upon the reaching of the trailing edge of this pulse), transistor 24 turns off, returning the voltage at connection point E to negative and opening switch 29. A resistor 39 and a capacitor 40 are connected in series between the common junction of elements 26 and 27 and the negative supply lead, to lengthen (to 200 milliseconds) the pulse applied to transistor 28. This causes transistor 28 to turn off 100 milliseconds later than transistor 24; when transistor 28 turns off, the voltage at connection point G returns to positive, closing switch 20, which makes amplifier 19 a unity gain inverting amplifier. The lengthening of the turning-off time of transistor 28 to 200 milliseconds allows switch 29 to open 100 milliseconds before switch 20 closes.

A capacitor 41, connected across switch 20, holds the potential across this switch during the switching time, to prevent large excursions.

Capacitor 32 then holds its potential (with less than 1 percent decay in 60 minutes), causing the source voltage of transistor 33 to remain constant. This voltage is connected (by way of amplifier 34 and a resistor 42 in lead 89) to item 43, an inverting unity gain operational amplifier having its output connected over a resistor 44 to a transistor 45 connected as an emitter follower. The feedback resistor 46 of amplifier 43 is tied to the emitter of transistor 45. This results in a voltage, of the same amplitude but opposite in polarity to the voltage at the source of transistor 33, appearing at the emitter of transistor 45.

Shortly after the recorder has read out peak "A," the first timed relay 11 opens (as controlled by the timing motor). This removes the positive potential from the gate electrodes of switches 13, 15, and 17, thus opening all of these switches, and removes the "arm" voltage from the emitter of transistor 24.

The ratio of the peak amplitudes of gas components "A" and "B" is computed in analog fashion, with capacitor-FET memory-hold circuits and operational amplifiers.

A second timed relay 47, similar to relay 11, is energized shortly before component peak "B" is read out on the recorder. When relay 47 is energized, a positive 12-volt potential is applied to connection point D, and thus (1) via a diode 48 to the gate electrode of a FET switch 49 (connected between the upper end of potentiometer 2 and slider 1); (2) via a diode 50 to the gate electrode of a FET switch 51 (connected by way of a lead 91 between the emitter of transistor 45 and the lower end of transmitting potentiometer 2); and (3) to the emitter circuit of a transistor 52. Therefore, at this time switches 49 and 51 are closed, and transistor 52 is armed.

Now, potentiometer 2 is connected as a variable resistor (maximum value 50 K) to the output of emitter follower 45. As component peak "B" is read out on the recorder, the "peak picker" switch 8 closes, grounding resistor 9 (the "near zero" switch 7 having already closed). This produces a pulse of 100 milliseconds length at the input of transistor 52. Since transistor 52 is armed at this time, it conducts, and the pulse is transmitted over a diode 53 and a resistor 54 to the input of a transistor 55; transistor 55 also then conducts. When transistor 52 conducts, connection point F goes positive; when transistor 55 conducts, connection point H goes negative.

The potentiometer slider 1 is connected by way of a lead 90 through the controlled current flow path of a FET switch 56 to the inverting input of an operational amplifier 57. The gate electrode of switch 56 is connected via a diode 58 to connection point F, so when point F goes positive (transistor 52 conducting), switch 56 closes. The output of amplifier 57 is connected through the controlled current flow path of a FET switch 59 and a resistor 60 to the ungrounded plate of a storage capacitor 61 one plate of which is grounded. The gate electrode of switch 59 is connected via a diode 62 to connection point F also, so that switches 56 and 59 are both closed when transistor 52 turns on.

The output of amplifier 57 is also connected through the controlled current flow path of a FET switch 63 and a resistor 64 back to its inverting input. The gate electrode of switch 63 is connected via diode 65 to connection point H, so when point H goes negative (transistor 55 conducting), switch 63 opens.

As a result of the above-described connections (switches 51 and 56 closed), the voltage representing peak "A" (appearing at the emitter of transistor 45) is connected through variable resistor 2 to operational amplifier 57. The resistance of resistor 2 at this time is proportional to peak "B" (since slider 1 is geared to the recorder pen drive mechanism, now reading out peak "B"). The ratio of the voltage of peak "A" to the resistance of peak "B" therefore equals the current through resistor 2.

The ungrounded plate of capacitor 61 is coupled through a FET 66 (operating as an amplifier) to the input of an operational amplifier follower 67, and a feedback resistor 68 is coupled from the output of amplifier 67 back to the inverting input of amplifier 57. Now, the output voltage of amplifier 57 will be of a value to flow the same amount of current (same as the current through resistor 2) through feedback resistor 68. Therefore, the output voltage of amplifier 57 will now represent the ratio of peak "A" to peak "B," times the calibration constant of resistor 68. This results from the following: since switch 59 is closed at this time, capacitor 61 will have charged to a voltage sufficient to flow feedback current through operational amplifier follower 67 and resistor 68. The voltage at the output of amplifier 67, representing the ratio A/B, will be held.

The voltage A/B is taken off from the output of amplifier 67 by a lead 69 and applied to a switching terminal 70. This voltage may be monitored by meter 38 when the selector switch 37 is on terminal 70.

As the pulse, produced by the "peak picker" switch 8 closure (which grounds resistor 9), turns off, transistor 52 turns off, returning the voltage at connection point F to negative and opening switches 56 and 59. A resistor 71 and a capacitor 72 are connected in series between the common junction of elements 53 and 54 and the negative supply lead, to lengthen (to 200 milliseconds) the pulse applied to transistor 55. This causes transistor 55 to turn off 100 milliseconds later than transistor 52; when transistor 55 turns off, the voltage at connection point H returns to positive, closing switch 63, which then provides feedback through resistor 64 for amplifier 57.

After the recorder has read out peak "B," the second timed relay 47 opens. This removes the positive potential from the gate electrodes of switches 49 and 51, opening these switches; it also removes the "arm" voltage from the emitter of transistor 52.

An operational amplifier 73 is used to limit the ratio A/B to some preselected value between zero and one (such as 0.1, for example). The inverting input of amplifier 73 is coupled by means of a resistor 74 to the output of amplifier 67, and the output of amplifier 73 is coupled through a diode 75 to the non-inverting input 76 of amplifier 57. An adjustable voltage positive with respect to ground, derived from the slider of a potentiometer 77 which is connected in series with a fixed resistor 78 between + 12 volts and ground, is applied to the non-inverting input of amplifier 73. Any voltage increase (at the output of amplifier 67) representing an A/B ratio greater than 0.1 (or any other value between zero and one, as preselected by adjustment of the slider on potentiometer 77) will be impressed on terminal 76 of amplifier 57, clamping its output. This limits the "ratio" output to some preselected value.

An operational amplifier 79, similar in construction to amplifiers 19, 43, 57, and 73, and a transistor 80 serve to convert the voltage representing ratio A/B to a proportional current, with limits of four milliamperes and twenty milliamperes, which may then be used to drive a valve system for control purposes. A regulated power supply 81 (providing plus and minus 12 volts d.c., but separate from the identical power supply used for the remainder of the circuit in the drawing) is utilized for powering the voltage-to-current converter.

The "ratio" output voltage of amplifier 67 is divided by a voltage divider including two resistors 82 and 83 and then applied to the inverting input of amplifier 79. The output of this amplifier is coupled over a resistor 84 to the base of the transistor 80, output from the latter being taken at the emitter thereof and fed to the negative "current output" terminal 85. The positive "-current output" terminal 86 is coupled through a milliammeter 87 to ground, and thence through an adjustable resistance network 88 to the common or neutral output terminal of the power supply 81.

Relays 11 and 47 are used to match the switching voltages of the chromatograph control circuit. These could be replaced with solid-state components.

The invention claimed is:

1. In a two-component chromatograph including a recorder whose pen is driven in accordance with first and second detected peaks eluting at different, known times from a chromatographic column: means for developing and storing a voltage representative of said first peak, a variable resistor so coupled to the recorder pen drive mechanism that the resistance thereof is proportional to said second peak, means for applying said voltage to one end of said resistor, an operational amplifier, switching means which when closed connects the other end of said resistor to the input of said amplifier, means operating upon the recorder pen reaching the summit of said second peak for actuating said switching means to its closed position, and a feedback circuit around said amplifier including a series resistor connected to the amplifier input, said circuit comprising means operating concomitantly with the closing of said switching means for producing a flow of current through said series resistor equal to the current flow through said variable resistor at its resistance value which corresponds to the summit of said second peak.

2. Apparatus defined in claim 1, wherein said switching means is voltage-actuated, and wherein said means operating upon said recorder pen produces a voltage upon the recorder pen reaching said summit.

3. Apparatus according to claim 2 wherein said feedback circuit connected between the output and the input of said amplifier also comprises a voltage-actuated switch in series in said circuit, and means for utilizing said produced voltage to actuate said last-mentioned switch to its closed position.

4. Apparatus defined in claim 1, wherein the first-mentioned means comprises means coupled to the recorder pen drive mechanism for developing a voltage representative of the first peak, an operational amplifier receptive of said voltage, a storage capacitor, a second switching means acting when closed to couple the output of said last-mentioned amplifier to said capacitor, and means operating upon the recorder pen reaching the summit of said first peak for actuating said second switching means to its closed position.

5. Apparatus defined in claim 4, wherein said second switching means is voltage-actuated, and wherein the means which actuates said second switching means to its closed position produces a voltage upon the recorder pen reaching the summit of said first peak.

6. Apparatus defined in claim 5, wherein said first recited switching means is voltage-actuated, and wherein the means which actuates said first recited switching means to its closed position produces a voltage upon the recorder pen reaching the summit of said second peak.

7. Apparatus according to claim 1, including also means for limiting the voltage output of said operational amplifier to a definite maximum value.

8. Apparatus defined in claim 7, wherein the means for limiting comprises a negative feedback arrangement with an adjustable threshold coupled between the output and the input of said operational amplifier.

* * * * *